US010552488B2

(12) United States Patent
Pennacchiotti et al.

(10) Patent No.: US 10,552,488 B2
(45) Date of Patent: Feb. 4, 2020

(54) SOCIAL MEDIA USER RECOMMENDATION SYSTEM AND METHOD

(71) Applicant: OATH INC., New York, NY (US)

(72) Inventors: Marco Pennacchiotti, Mountain View, CA (US); Siva Gurumurthy, Fremont, CA (US)

(73) Assignee: OATH INC, New York, NY (US)

( * ) Notice: Subject to any disclaimer, the term of this patent is extended or adjusted under 35 U.S.C. 154(b) by 141 days.

(21) Appl. No.: 15/288,567

(22) Filed: Oct. 7, 2016

(65) Prior Publication Data

US 2017/0024406 A1    Jan. 26, 2017

Related U.S. Application Data

(63) Continuation of application No. 13/297,988, filed on Nov. 16, 2011, now Pat. No. 9,466,071.

(51) Int. Cl.
*G06F 16/9032* (2019.01)
*G06N 20/00* (2019.01)
*G06F 16/9535* (2019.01)
*G06Q 50/00* (2012.01)
*G06Q 30/02* (2012.01)

(52) U.S. Cl.
CPC .... *G06F 16/90324* (2019.01); *G06F 16/9535* (2019.01); *G06N 20/00* (2019.01); *G06Q 30/0255* (2013.01); *G06Q 50/01* (2013.01)

(58) Field of Classification Search
CPC .......................... G06F 16/3097; G06N 99/005
See application file for complete search history.

(56) References Cited

U.S. PATENT DOCUMENTS

| | | | |
|---|---|---|---|
| 8,180,804 B1 | 5/2012 | Narayanan et al. | |
| 2003/0149612 A1* | 8/2003 | Berghofer | G06Q 30/02 705/7.29 |
| 2005/0091203 A1 | 4/2005 | Liu et al. | |
| 2008/0126176 A1* | 5/2008 | Iguchi | G06Q 30/0201 705/7.29 |
| 2010/0030648 A1 | 2/2010 | Manolescu et al. | |

(Continued)

OTHER PUBLICATIONS

Hong, Liangjie, and Brian D. Davison. "Empirical study of topic modeling in twitter." Proceedingsof the first workshop on social media analytics. ACM, 2010. (Year: 2010).*

(Continued)

*Primary Examiner* — Scott A. Waldron
*Assistant Examiner* — Kevin W Figueroa
(74) *Attorney, Agent, or Firm* — James J. DeCarlo; Greenberg Traurig, LLP

(57) ABSTRACT

Each user is represented by a mixture of topics, e.g., one or more topics, and a probability of interest in each topic in the mixture, and given the target user, one or more other users can be recommended, each user that is recommended to the target user is determined to have a topical interest similarity with the target user, e.g., the target user's interest in one or more topics of the mixtures of topics is determined to be similar to a recommended interest in the one or more topics of the mixture of topics. The target user and the one or more recommended users can be said to have similar topical interests. The target user can use the user recommendation to establish an interactive dialogue, for example, with one or more users identified in the user recommendation.

18 Claims, 7 Drawing Sheets

(56) References Cited

U.S. PATENT DOCUMENTS

| | | | |
|---|---|---|---|
| 2010/0287033 A1 | 11/2010 | Mathur | |
| 2011/0314084 A1* | 12/2011 | Saretto | G06F 17/30867 |
| | | | 709/203 |
| 2012/0005221 A1 | 1/2012 | Ickman et al. | |
| 2012/0005224 A1* | 1/2012 | Ahrens | H04W 4/21 |
| | | | 707/769 |
| 2012/0041953 A1 | 2/2012 | Dumais et al. | |
| 2012/0150955 A1* | 6/2012 | Tseng | H04L 51/22 |
| | | | 709/204 |
| 2012/0209907 A1* | 8/2012 | Andrews | G06F 17/30867 |
| | | | 709/204 |

OTHER PUBLICATIONS

Chen, Jillin et al., "Make new friends, but keep the old: recommending people on social networking sites." Proceedings of the SIGCHI Conference on Human Factors in Computing Systems. ACM, 2009. [Online] <retrieved Jul. 18, 2014] <http://researchweb.watson.ibm.com/haifa/dept/imt/papers/chenCH109.pdf>.

Liang, Huizhi et al., "Personalized recommender systems integrating social tags and item taxonomy." Web Intelligence and Intelligent Agent Technologies, WI-IAT '09. IEEE/WIC/ACM International Joint Conferences on vol. 1. IET (2009).

Michelson, Matthew, and Sofus A. Macskassy. "Discovering users' topics of interest on twitter: a first look." Proceedings of the fourth workshop on Alalytics for noisy unstructured text data. ACM, 2010. [Online] <retrieved Jul. 18, 2014> <http://www.cs.rutgers.edu/~sofmac/paper/and2010/michelson-and2010.pdf>.

* cited by examiner

SOCIAL MEDIA USER RECOMMENDATION SYSTEM AND METHOD

CROSS REFERENCE TO RELATED APPLICATIONS

This application is a continuation of and claims priority from co-pending U.S. patent application Ser. No. 13/297,988, filed Nov. 16, 2011, entitled SOCIAL MEDIA USER RECOMMENDATION SYSTEM AND METHOD, which is hereby incorporated by reference.

FIELD OF THE DISCLOSURE

This disclosure relates to social media user recommendation, and more particularly to making social media user recommendations from users' topical interests identified from words used in social media messages.

BACKGROUND

The internet has become a mechanism for interactive dialogue among internet users. Electronic mail, or email, microblog, and web log, or blog, are examples of tools that users have used to communicate. Another type of communication that is used is short text based communication, e.g., texting. Much of the communication is between users that have some previously-known connection, e.g., a social connection. A social network, or other type of social structure, is composed of entities that have some type of established connection, e.g., via a friendship, work, church, etc. User communication, including text based communication, is limited to the user's social network.

SUMMARY

What is needed is a mechanism to recommend users, e.g., new friends, to a target user based on topical interests. The present disclosure seeks to address failings in the art and to provide a recommendation system and method of user recommendation. In accordance with one or more embodiments, a user recommendation is made to a target user, the recommendation identifying one or more other users determined to have similar topical interest(s) with the target user. The target user can use the user recommendation to establish an interactive dialogue, for example, with one or more users identified in the user recommendation. The user is provided with a potential audience that includes users previously unknown to the user. In accordance with one or more such embodiments, each user can be represented by a mixture of topics, e.g., one or more topics, and a probability of interest in each topic in the mixture, and given the target user, one or more other users can be recommended, each user that is recommended to the target user is determined to have a topical interest similarity with the target user, e.g., the target user's interest in one or more topics of the mixtures of topics is determined to be similar to a recommended interest in the one or more topics of the mixture of topics. The target user and the one or more recommended users can be said to have similar topical interests.

Disclosed herein, in accordance with one or more embodiments, is a method comprising generating, via at least one processor, a plurality of social-media message aggregates, each social-media message aggregate corresponding to a user of a plurality of users, the user's social-media message aggregate being generated from a plurality of the user's social-media messages; determining, via the at least one processor, a plurality of topics using the plurality of social-media message aggregates; generating, via the at least one processor, a plurality of interest distributions, each interest distribution corresponding to one of the users of the plurality of users, the user's interest distribution being generated using the user's social-media message aggregate and identifying the user's level of interest in each of the plurality of topics; identifying, via the at least one processor and for a target user, at least one other user of the plurality of users having a similar topical interest with the target user, the identifying using the interest distribution of the target user and the interest distribution of the at least one other user; and causing, via the at least one processor, a user recommendation to be transmitted to the target user, the user recommendation comprising the at least one other user of the plurality of users having a similar topical interest with the target user.

In accordance with one more embodiments, a system is disclosed. The system comprising at least one computing device comprising one or more processors to execute and memory to store instructions to generate a plurality of social-media message aggregates, each social-media message aggregate corresponding to a user of a plurality of users, the user's social-media message aggregate being generated from a plurality of the user's social-media messages; determine a plurality of topics using the plurality of social-media message aggregates; generate a plurality of interest distributions, each interest distribution corresponding to one of the users of the plurality of users, the user's interest distribution being generated using the user's social-media message aggregate and identifying the user's level of interest in each of the plurality of topics; identify, for a target user, at least one other user of the plurality of users having a similar topical interest with the target user, the identifying using the interest distribution of the target user and the interest distribution of the at least one other user; and cause a user recommendation to be transmitted to the target user, the user recommendation comprising the at least one other user of the plurality of users having a similar topical interest with the target user.

A computer readable non-transitory storage medium for tangibly storing thereon computer readable instructions that when executed cause, in accordance with at least one embodiment, at least one processor to generate a plurality of social-media message aggregates, each social-media message aggregate corresponding to a user of a plurality of users, the user's social-media message aggregate being generated from a plurality of the user's social-media messages; determine a plurality of topics using the plurality of social-media message aggregates; generate a plurality of interest distributions, each interest distribution corresponding to one of the users of the plurality of users, the user's interest distribution being generated using the user's social-media message aggregate and identifying the user's level of interest in each of the plurality of topics; identify, for a target user, at least one other user of the plurality of users having a similar topical interest with the target user, the identifying using the interest distribution of the target user and the interest distribution of the at least one other user; and cause a user recommendation to be transmitted to the target user, the user recommendation comprising the at least one other user of the plurality of users having a similar topical interest with the target user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a process overview in accordance with one or more of the present disclosure.

FIG. 2 provides an example of topics identified in accordance with one or more embodiments of the present disclosure.

FIG. 3 provides an example of a user's interest distribution in accordance with one or more embodiments of the present disclosure.

FIG. 4 provides an example of a user recommendation process flow in accordance with one or more embodiments of the present disclosure.

FIG. 5 provides an example of a system component overview in accordance with one or more embodiments of the present disclosure.

FIG. 6 provides user recommendation combination process flow in accordance with one or more embodiments of the present disclosure.

DETAILED DESCRIPTION

Figure 1:
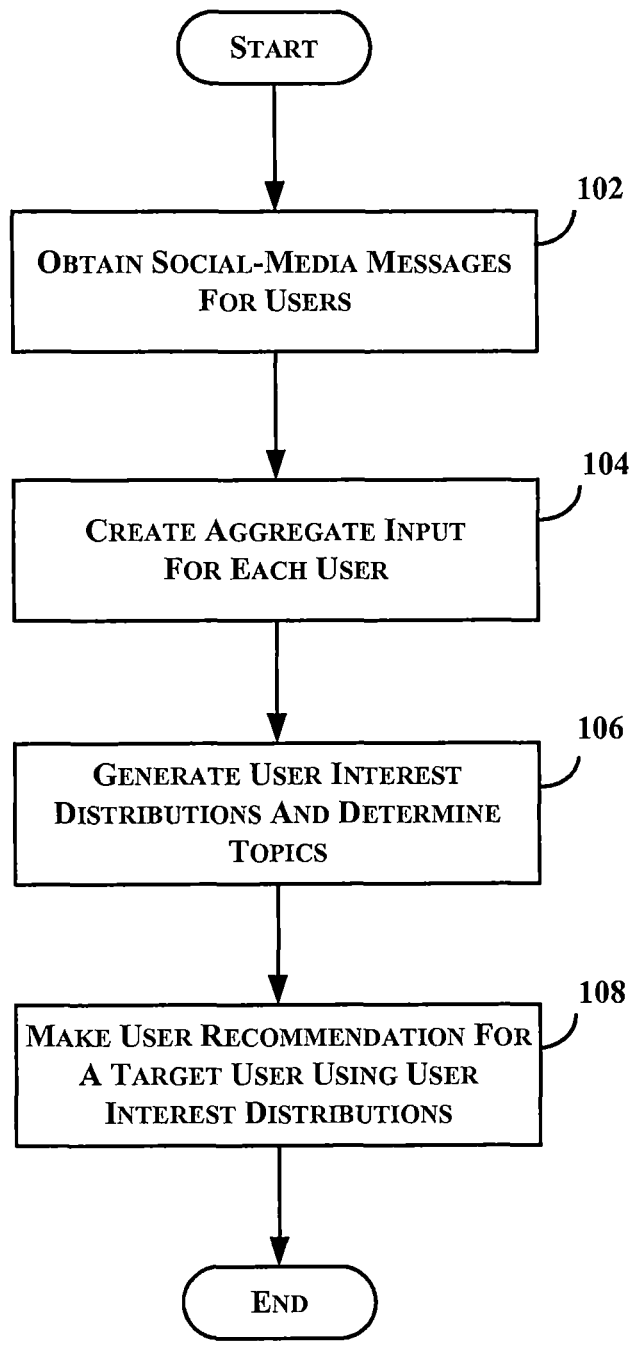

In general, the present disclosure includes a social media user recommendation system, method and architecture.

Certain embodiments of the present disclosure will now be discussed with reference to the aforementioned figures, wherein like reference numerals refer to like components.

In accordance with one or more embodiments, social-media posts, or streams, for a number or plurality of users are collected. By way of non-limiting examples, the social-media posts can be any type of posts or other interactive dialogue, including without limitation email, microblog, and web log, or blog, text messages. Embodiments of the present disclosure are described with reference to short text messages, and more particularly Twitter™ Tweets™, Facebook™ wall posts, Yahoo!™ Y! Messenger™ and/or Y! Mail™ messages, etc. It should be apparent that any type of user post, message or dialogue can be used in conjunction with embodiments of the present disclosure.

The social-media posts aggregated by user are input to a model generator, e.g., Latent Dirichlet Allocation (LDA), probabilistic latent semantic indexing (PLSI), etc. model generator, which generates a generative model, e.g., an LDA model, comprising an interest distribution, e.g., a multinomial distribution, for each user, and a set of topics. For each user, the interest distribution defines a topic-probability pairing for each topic in the set of topics. In a topic-probability pairing, the probability represents the likelihood that the user is interested in the topic. By way of a non-limiting example, the probability, or likelihood, comprises a value between 0 and 1, where 1 indicates that the user is interested in the topic and 0 indicates that the user is not interested in the topic.

In one or more embodiments, given a number U of users and a number K of topics, each user u is represented by a mutinomial distribution $\theta_u$ over topics, which is drawn from a Dirichlet prior with parameter $\alpha$. A topic is represented by a multinomial distribution $\beta_k$ drawn from another Dirichlet prior with parameter $\eta$. With the generative model, each word position n in a user stream is assigned a topic $z_{u,n}$ drawn from $\theta_u$, and that the word in that position $w_{u,n}$ is drawn from the distribution $B_{Z_{u,n}}$.

In accordance with one or more embodiments, the model comprising user interest distributions is used for a target user, $u_t$, to make a recommendation of users that are determined to have a similar topical interest with the target user. In accordance with one or more embodiments, the target user's interest distribution is compared to another user's interest distribution to determine a similarity value, or values. A determined similar value can be compared to a threshold similarity value to determine whether or not to include the other user in the user recommendation for the target user. In other words, the other user can be determined to where a determined similarity value satisfies a threshold similarity to the target user's distribution. The threshold similarity value can be preconfigured or dynamically set. In the latter case, for example, the threshold can be determined such that the threshold selects a number, n, of users as user recommendations for the target user. Alternatively, a plurality of users are ranked based on each user's determined similarity value, e.g., as determined by comparing the target user's interest distribution with the user's interest distribution, and a top n users are selected for inclusion in the user recommendation for the target.

The user recommendation identifying the plurality of users having similar topical interests determined using the interest distributions can be made in response to an expressed request by the target user, for example. The user recommendations can comprise Twitter™, Facebook™ or other social-media site's users, for example. The target user might make the request in conjunction with a message prepared by the target user, such as a message via Y! Message™ or other messaging platform or service, e.g., Facebook™, Twitter™, etc. The target user might select one or more users from the user recommendation as recipients of the message. The user might select one or more users from the user recommendation to "follow" via the social-media site, e.g., follow via Twitter™, etc. As is described in more detail below, the user recommendation can comprise a set of users identified from the interest distributions, e.g., by comparing interest distributions to identify users with similar topical interest, alone or in combination with other techniques for identifying users, e.g., social network graph-based models. In accordance with one or more embodiments, one or more preference settings set by the user can determine the timing and manner by which the user recommendation is determined and/or presented to the user.

FIG. 1 provides an example of a process overview in accordance with one or more of the present disclosure. At step 102, social-media messages are obtained. The messages can be collected in a log, a database or other data store by one or more social-media services, for example. The data collected at step 102 can include other information about each user, such as without limitation user identification information, number of friends of the user, number of followers of the user, etc. At step 104, messages for a given user are used to generate an aggregate dataset, or document, for use in generating the user's interest distribution. In accordance with one or more embodiments, an aggregate dataset can be created for each user that is represented by the data obtained in step 102. Alternatively, one or more users can be selected from the users represented by the data using selection criteria, and an aggregate dataset can be created for the selected users. By way of one non-limiting example, users can be selected using one or more selection criteria, e.g., a threshold number of messages, a threshold number of friends and/or a threshold number of followers of the user. The selection criteria and/or the threshold number can vary or be the same for each selection criteria. In accordance with one or more embodiments, one or more filters can be applied to eliminate unwanted users. By way of some non-limiting examples, a spam filter, e.g., a dictionary-based spam filter, can be used to eliminate spam users, and/or a language filter, e.g., a dictionary-based language filter, can be used to eliminate users that do not use a specific language in the posts. For each selected user, the user's social-media messages are processed to remove stop words, e.g., remove words that appear in a stop-word dictionary. A user's messages are aggregated into a single, discrete dataset, or document. The aggregate dataset or document comprises data representing the user's topical interests over a period of time and multiple posts.

By way of a non-limiting example, where the social-media data comprises Tweets™ from the Twitter™ social-media service, the user's Tweets™ are received as a plurality of discrete messages, and are combined to form an aggregate dataset that represents the user's topical interests over a period of time and multiple Tweets™.

At step 106, the plurality of aggregate datasets of the users is used to identify the set of topics, and each user's aggregate dataset is used to determine the interest distribution for each user. In accordance with one or more embodiments, the plurality of aggregate datasets is input to a model generator, such as an LDA, PLSI, etc., model generator. The output of the model generator comprises a topical interest distribution for each user and a plurality of topics.

Figure 2:
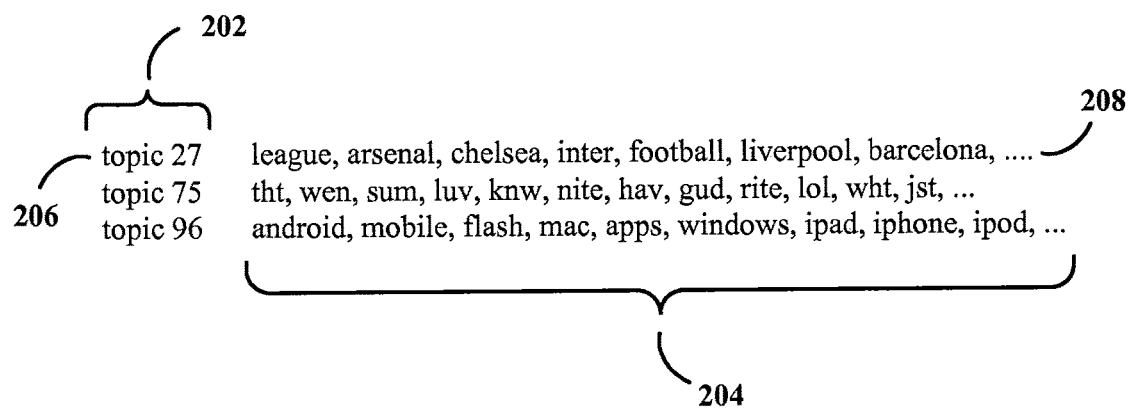

FIG. 2 provides an example of topics identified in accordance with one or more embodiments of the present disclosure. Topics 202 are examples of topics that can be identified from the users' aggregate datasets. Topic 27 and topic 96 are related to, and facilitate definition of, personal interests, and topic 75 is related to, and facilitates definition of, users' vocabulary. Each topic 202 has an associated set of words 204 that are associated with the topic. The words can be used to identify topics for an aggregate dataset and can be used to determine a user's level of interest in each of the plurality of topics. By way of a non-limiting example, a user's interest in topic 27, entry 206 of topics 202, can be determined using the user's aggregate dataset and a determination of the occurrences of the topics' words 208 in the user's aggregate dataset. In accordance with one or more embodiments, each word in the set of words 204 for a topic 202 can have an associated weighting, which can specify the words importance to the topic, and can be determined using the prominence or number of occurrences of the word in association with the topic in the corpus comprising the aggregated datasets of the plurality of users.

Figure 3:
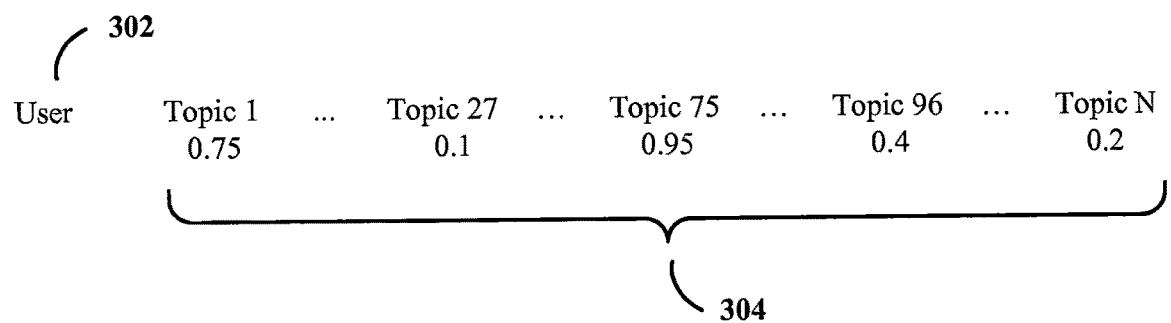

FIG. 3 provides an example of an interest distribution 304 for user 302 in accordance with one or more embodiments of the present disclosure. In the example, the interest distribution 304 comprises a vector including a value for each topic of the plurality of topics. Effectively, the vector can be used to define a topic-probability pairing for each topic of a set of topics. In the example, the vector has N topics, including topics 202 of FIG. 2. In the example and relative to the other topics in the interest distribution example, the user has a high level of interest in topic 75, a somewhat lesser interest in topic 1, and even less interest in topic 96, topic N and topic 27.

In accordance with one or more embodiments, a model, which can comprise the plurality of topics and the plurality of interest distributions, is built using a model generator, such as without limitation an LDA, PLSI, etc. model generator. In accordance with one or more embodiments, for each user, a document comprising an aggregate of the user's filtered social-media messaging input obtained from a social-media service is generated. A user's aggregate document comprises an aggregate of the user's social-media content, e.g., an aggregate of the use's social-media posts. Each user's aggregated content can be expressed as a mixture of topics, and each topic can be expressed as mixture of words from a corpus of words, e.g., the words from the set of users' aggregated content. The topic model generates a set of topics automatically discovered from the corpus of words. Each user in the corpus is automatically assigned an interest distribution comprising a probability "topic vector", where each dimension corresponds to a topic and has an associated value that represents the user's interest, or liking for, the corresponding topic.

Figure 4:
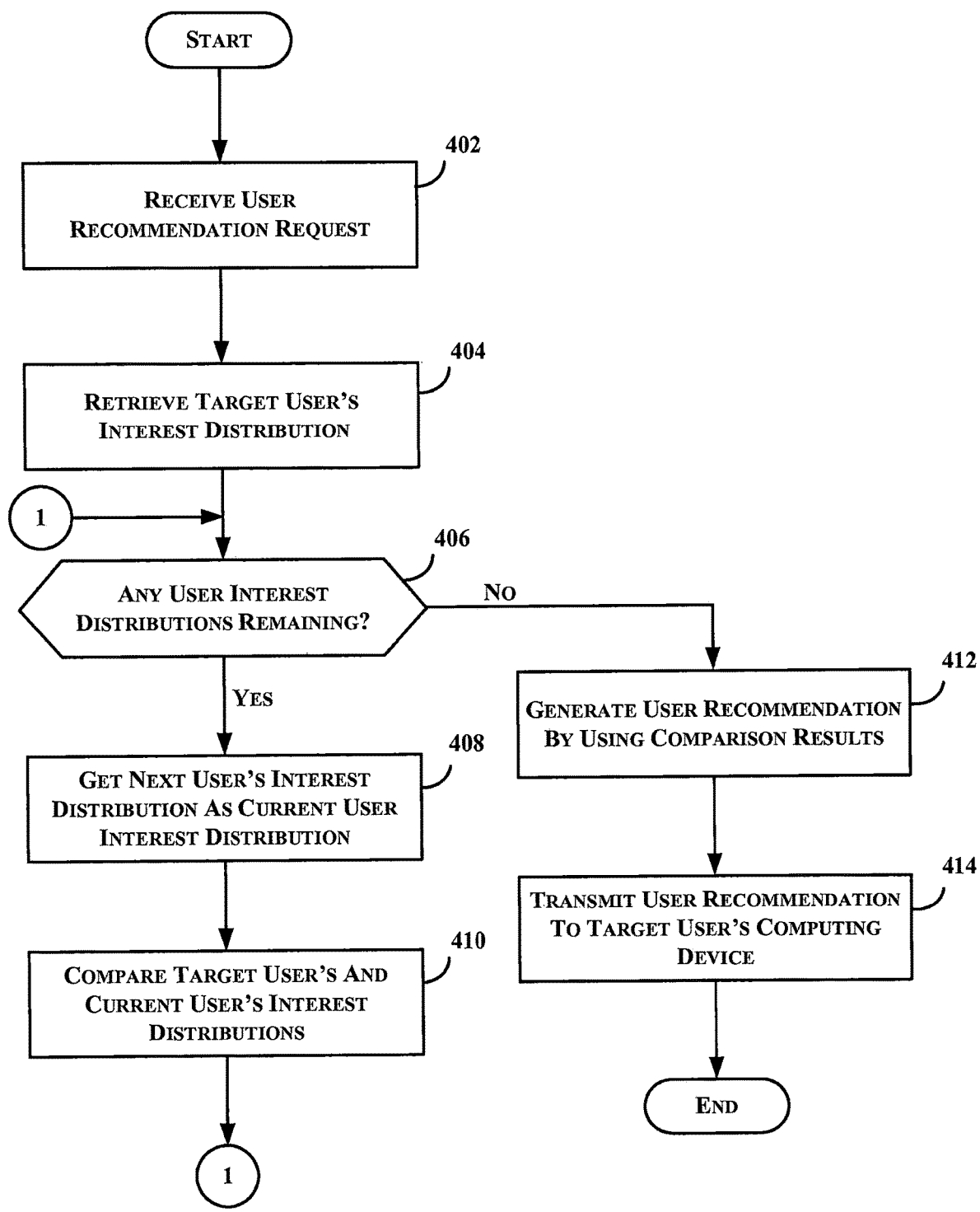

Referring again to FIG. 1, at step 108, the interest distributions generated at step 106 can be used to make a user recommendation for a target user. FIG. 4 provides an example of a user recommendation process flow in accordance with one or more embodiments of the present disclosure.

At step 402, a request is made for a user recommendation for a target user. The request can be initiated by the target user, a service or an application, e.g., a server-side or client-side application, for example. The request can include identification information identifying the target user. At step 404, the target user's interest distribution is retrieved. The target user's interest distribution can be retrieved using a user identifier (ID) included with the request, or determined using information received with the request.

In accordance with one or more embodiments, the target user's interest distribution is compared with each other user's interest distribution to determine a similarity in interests e.g., a similarity of interest in one or more topics from the set of topics, between the target user and the other user. The similarity is determined based on each user's topic interests. At step 406, a determination is made whether or not any user interest distributions remain to be processed in connection with the target user's interest distribution. If so, processing continues at step 408 to use the next user's interest distribution as the current user interest distribution. At step 410, the target user's interest distribution is compared to the current user's interest distribution. In accordance with one or more embodiments, a similarity of the two user's interest distributions is measured using similarity measurement functionality, such as symmetric Kullback Leibler (KL) divergence or a cosine similarity, using the topic probabilities as the weights of the vector.

Processing continues at step 406 to determine whether any user interest distributions remain to be processed, e.g., remain to be compared with the target user's interest distribution.

Steps 406, 408 and 410 can be performed in response to a recommendation request. Alternatively, the steps can be performed in advance, e.g., prior to a request, and a value can be stored for each user pairing, e.g., a similarity value determined from a comparison of two users' interest distribution.

At step 412, the user recommendation is generated using the comparison results. By way of some non-limiting examples, the user recommendation can comprise a threshold number of users and or those users that satisfy a threshold similarity with the target user. Step 414 can comprise a ranking of the user's based on their similarity to the target user, and/or some number of the top users, e.g., the users having the greatest similarity measure with the target user, can be selected using the ranking.

In accordance with one or more embodiments, where a social-media target user makes a query, or otherwise makes a request, for a user recommendation, a set of existing users that have a "topic vector" similar to the target user is returned in response to the request. Where the target user is a known user, e.g., a user with an interest distribution, the process shown in FIG. 4 can be used. Where the target user is a new user, a user without an interest distribution, the target user can be requested to provide input, e.g., keywords, describing topics in which the target user is interested. The target user's keyword input can be input to the model generator to generate an interest distribution for the new user. Alternatively, the new user can be requested to identify an existing user that the user believes has similar topical interests with the new user, and the existing user's interest distribution can be used for the new user. An interest distribution can be generated for the new user once there is a sufficient amount of social-media message data for the user.

By way of a non-limiting example, in a case of a new or an existing target user, a similarity value can be determined using a function, e.g., a function that computes a similarity value or measure, such as a function that computes a similarity using distance metrics in the vector space (e.g. cosine distance). Assuming for the sake of an example that a set of topics [T1, T2, T3, . . . , TN] is discovered from the corpus comprising the aggregate datasets of a plurality of users, including users A and B discussed below, by the model generator, e.g. LDA model generator.

Examples of topic-word distributions are:
T1: [Music: 0.87, Indian: 0.73, Bollywood: 0.5, . . . ],
T2: [War: 0.91, Hitler: 0.75, World: 0.6, . . . ].

In the example, topic T1 represents the topic of "Indian music" and the topic T2 represents the topic of the "Second World War". Each topic distribution comprises words associated with the topic, e.g., words that can be used to identify a topic given a set of words, such as the set of words belonging to a user's aggregate dataset. The following is an example of a topic vector for user A, as determined using the model generator:
[0.95, 0.8, 0.0, . . . , 0.02].

The above example of user A's interest distribution, user A has the greatest interest, relative to the other topics, in topic T1, "Indian music", with an interest probability value of 0.95, followed by topic T2, the "Second World War," with an interest probability value of 0.8.

The following is an example of an interest distribution for user B, which is determined using the model generator:
[1.0, 0.95, 0.0, . . . , 0.0].

In a comparison of user A's interest distribution and user B's interest distribution, it appears that user A and user B have a similar interest in topics T1 and T2, since both users have a high interest probability associated with "Indian music" and the "Second World War".

Continuing with the example, assume that user C is a new user interested in "Bollywood music". By way of a non-limiting example, user C can specify the keyword "Bollywood music". The keyword input can be mapped to topic T2, i.e., "Indian music". In such as case, user A can be included in a user recommended for user C.

In accordance with one or more embodiments, a user recommendation can be made in real-time to a given social media user. The user recommendation can include users previously unknown to the user, e.g., new friends, to connect with using a social media service, such as Twitter™, Y! Messenger™, Y! Mail™, Facebook™, etc., based on similar content disclosed in media messages collected for users. Examples of applications for one or more embodiments include without limitation: 1) introduction of a new tab for a social media service's user interface, which suggests new friends to a target user, based on the message history of the target user, which can include or constitute the message that the user is writing in real-time; 2) introduction of a new tab for a social media service's user interface, which suggests new friends to a target user, where the target user is a new user, e.g., when the target user initially joins a social-media platform or service; 3) in a trending dialogue provided to a user as part of a user interface, e.g., the user's home page, rank social-media users for a given one or more trending topics, based on the social-media users' interest in the one or more trending topics; and/or 4) use a topic related to a current web page, e.g., a topic present on the web page, to find related celebrities or popular personalities having an interest in the topic for presentation to the user, and/or to recommend to the user other web pages for exploration using the topic. The above examples are intended to be illustrative and are not intended to be limiting. It should be apparent that the functionality described in connection with one or more of the embodiments described herein can be used with other applications.

Figure 5:
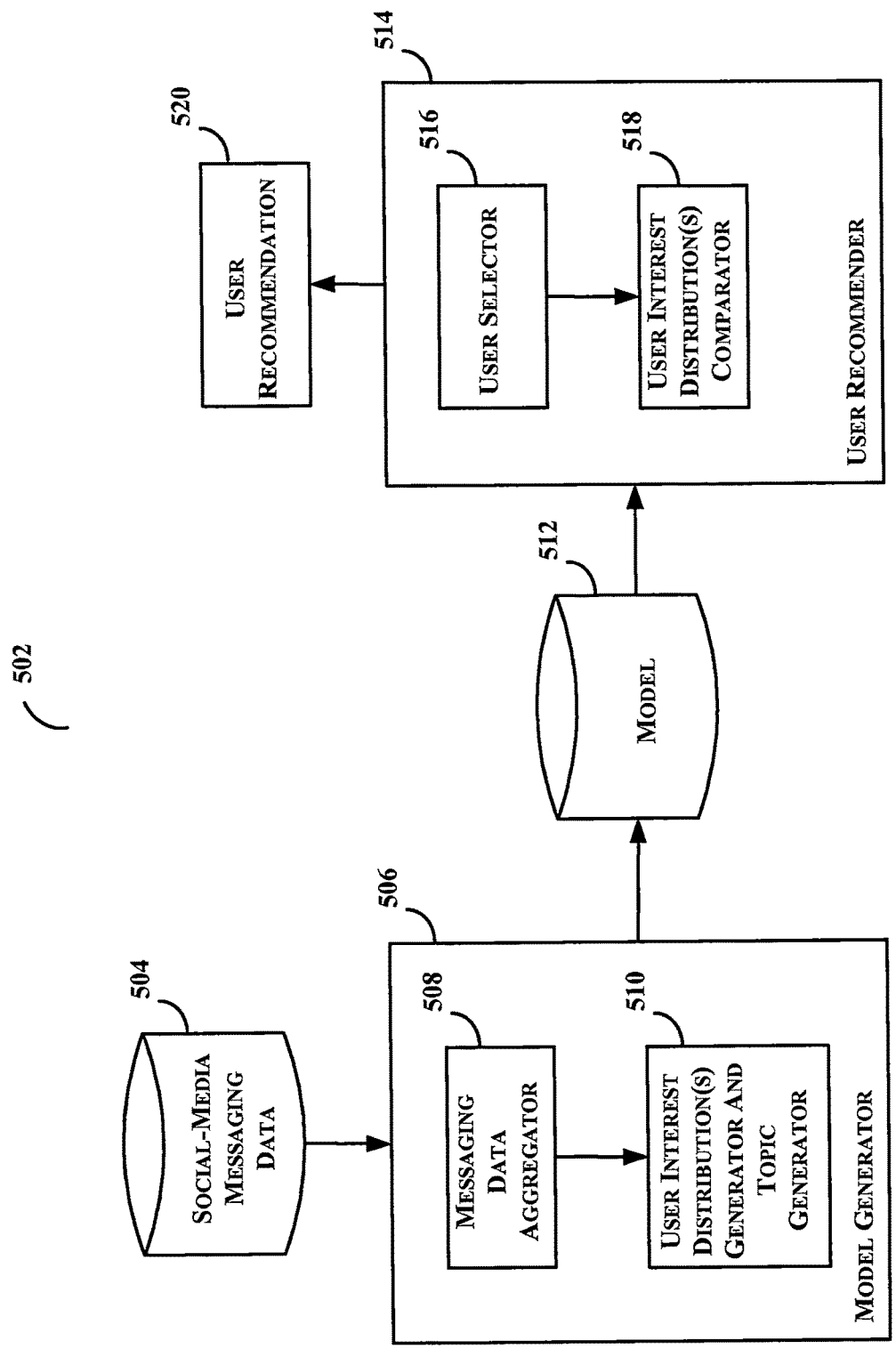

FIG. 5 provides an example of a system component overview in accordance with one or more embodiments of the present disclosure. System 502 comprises a model generator 506 and a user recommender 514. The components shown in the example can be implements by one or more computing devices, e.g., server computers. While the components are shown separately, one or more components can be combined into a single component.

Model generator 506 comprises a messaging data aggregator 508 and user interest distribution and topic generator 510. Messaging data aggregator 508 obtains social-media messaging data 504, e.g., messaging data collected from one or more social-media platforms, e.g., services or server applications provided by one or more social-media services. In accordance with one or more embodiments, aggregator 508 can provide functionality such as that discussed above in connection with steps 102 and 104 of FIG. 1, and model generator 506 can provide functionality such as that discussed above in connection with step 106 of FIG. 1.

User recommender 514 implements functionality discussed in connection with step 108 of FIG. 1 and the steps of FIG. 4. More particularly, user distribution comparator 518 provides functionality to implement steps 402, 404, 406, 408 and 410 of FIG. 4, and user selector 516 provides functionality to implement steps 412 and 414 of FIG. 4. User selector 516 selects one or more users to be presented to the target user as user recommendation 520.

In accordance with one or more embodiments, the user recommendation can comprise one or more users selected from a comparison of user interest distributions and one or more users selected using one or more social network graphs, e.g., friends graph and/or follower graphs.

Figure 6:
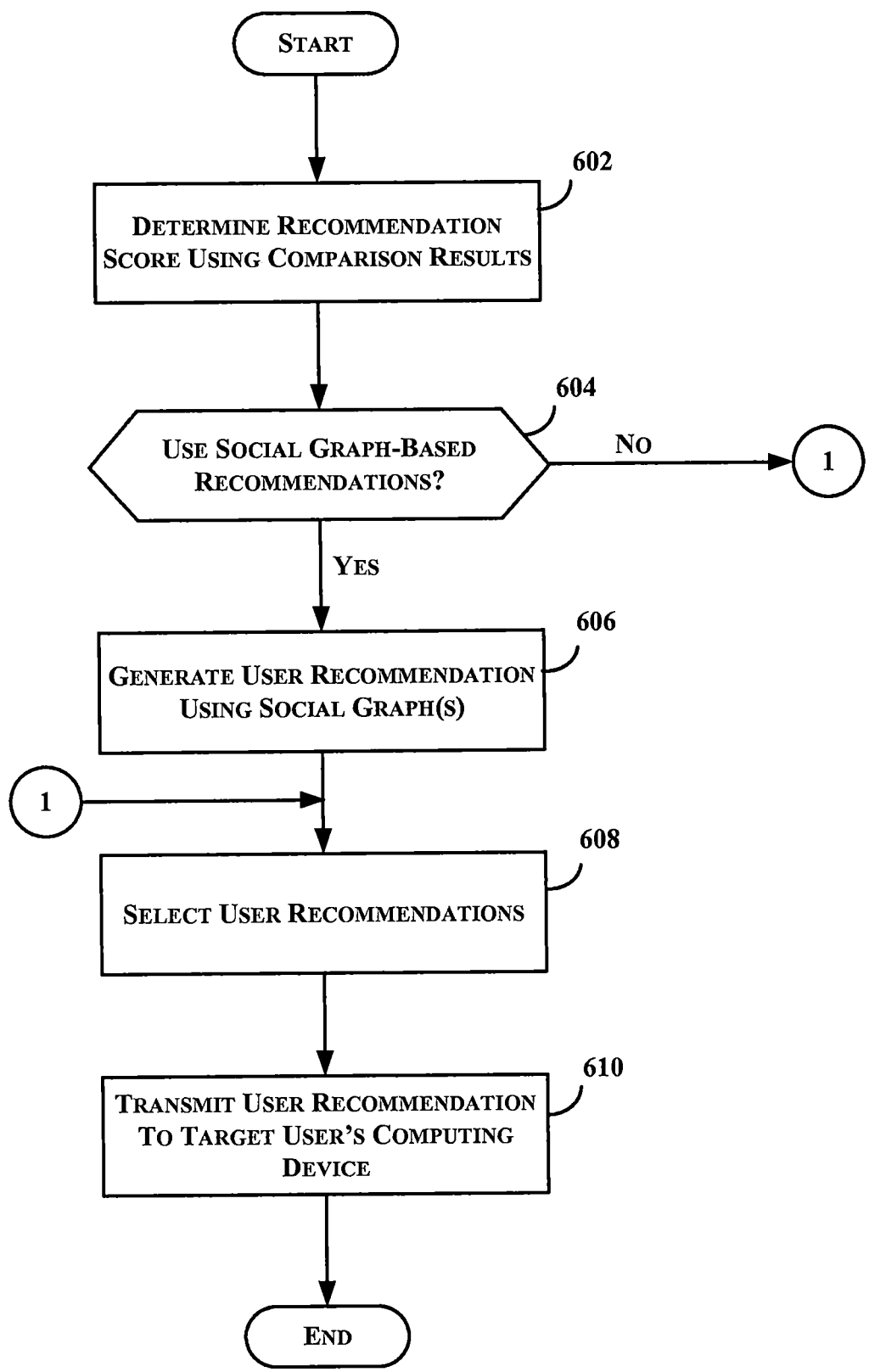

FIG. 6 provides user recommendation combination process flow in accordance with one or more embodiments of the present disclosure. At step 602, a score is generated using the comparison results from steps 406, 408 and 410 for each pairing between the target user and another user. At step 604, a determination is made whether or not to use one or more graph-based models, e.g., social networking graphs. If not, processing continues at step 608 to select users for the user recommendation using the results formed from comparison of user interest distributions, and the user recommendation is transmitted to the target user at step 610. In other words, where a determination is made to not use one or more social graph-based models, steps 608 and 610 correspond, respectively, to steps 412 and 414 of FIG. 4.

Where it is determined, at step 604 of FIG. 6, to use one or more social graph-based models, processing continues at step 606 to generate user recommendations using the social graph-based model(s). In accordance with one or more embodiments, the similarity score determined relative to the target user and another user is a combined score comprising the similarity score generated by comparing the two user's interest distributions, e.g., per step 410 of FIG. 4, and the score provided via the one or more social graph-based model(s).

In accordance with one or more embodiments, the scores can be combined, e.g., linearly. By way of a non-limiting example, given the recommendation score returned via step 410 of FIG. 4, a topical-interest similarity score referred to herein as scoreT, and the recommendation score returned by the graph-based model, a social relationship score referred to herein as scoreG, a combined score, referred to herein as scoreC, can be obtained. The following provides a non-limiting example of a formula to combine the recommendation scores:

$$scoreC = A*scoreT + (1-A)*scoreG,$$

where A is a constant that ranges in value from 0 and 1, and can be a learned value. The value of A can be a weighting that emphasizes one or the other of score T and scoreG, or applies an equal weighting to scoreT and scoreG, for example. The value of A can be used to apply an equal weighting to the two recommendation scores, e.g., where A is equal to 0.5.

In accordance with one or more embodiments, topics in the set of topics can be added as nodes to a social graph, nodes corresponding to users in the graph can be connected to a topic node, and relationships between users can be formed via one or more topic nodes. By way of a non-limiting example, each node in a social graph represents a user and an edge between two nodes represents a relationship between the two users represented by the two nodes. Where the social graph is a friends-graph, each edge represents a friendship between the users represented by the nodes. Similarly, where the social graph is a followers-graph, each edge represents a follower relationship between the users represented by the nodes. The value of scoreG is determined based at least in part on the interconnections between the nodes in the social graph.

In accordance with one or more embodiments, the graph comprises a social network graph and a topical interest graph. The social network graph comprises nodes representing users and an edge connecting user nodes representing a social relationship. The topical interest graph comprises topic nodes representing the plurality of topics, an edge connecting a user node and a topic node representing a topic representing the user's interest in the topic. Users connected to a given topic node are considered to be related on a topical interest basis. An edge that connects a user node to a topic node can be assigned a weighting that corresponds to the user's level of interest in the topic, as identified by the value corresponding to the topic in the user's distribution. Edge weightings can be used to determine the strength of the relationship between two users, e.g., two users connected to a topic node either directly or via one or more user nodes and/or topic nodes. The graph can be traversed to identify one or more users having a social relationship and/or a topical interest relationship with the target user. By way of a non-limiting example, a topic node having an edge connection with the target user representing at least a threshold interest of the target user in topic can be used to identify other users having an edge connection with the target user representing a similar interest in the topic.

Figure 7:
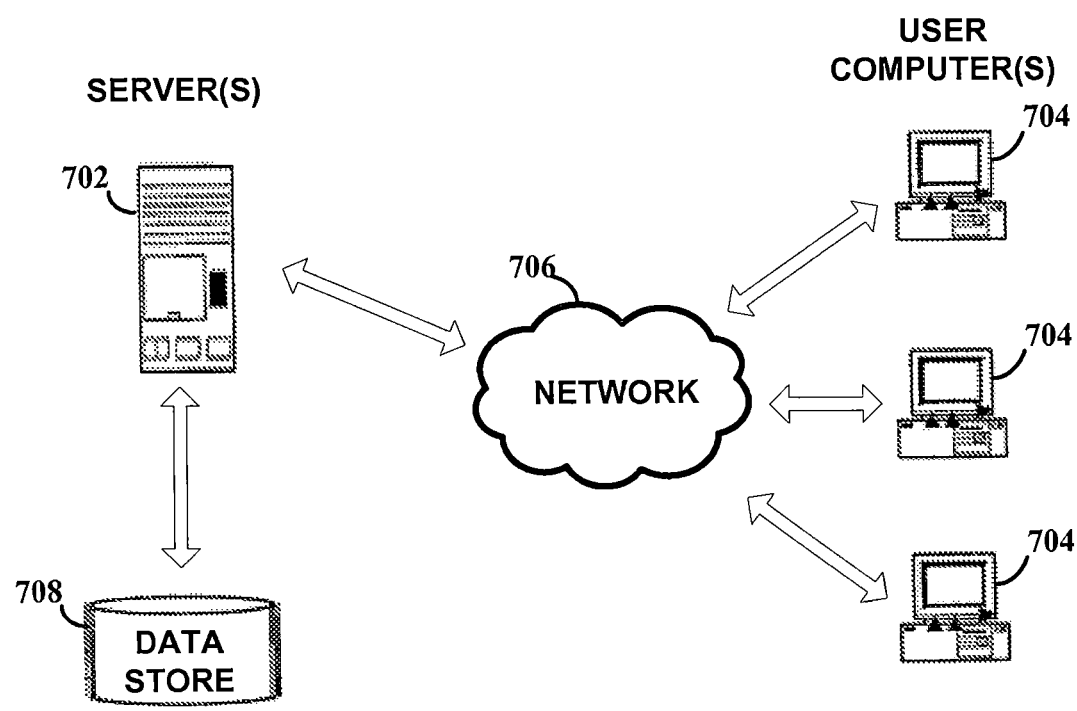
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 702 can be configured to execute program code, instructions, etc. to provide functionality in accordance with one or more embodiments of the present disclosure.

Computing device 702 can serve content to user computing devices 704 using a browser application via a network 706. Data store 708, which can include social-media messaging data 504 and/or user distribution model 512, can be used to store program code to configure a server 702 to execute functionality described in accordance with one or more embodiments of the present disclosure, e.g., components described in connection with FIG. 5.

The user computing device 704 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computing device 704 can include one or more processors, memory, a removable media reader, network interface, display and interface, and one or more input devices, e.g., keyboard, keypad, mouse, etc. and input device interface, for example. One skilled in the art will recognize that server 702 and user computing device 704 may be configured in many different ways and implemented using many different combinations of hardware, software, or firmware.

In accordance with one or more embodiments, a computing device 702 can make a user interface available to a user computing device 704 via the network 706. The user interface made available to the user computing device 704 can include content items, or identifiers (e.g., URLs) selected for the user interface in accordance with one or more embodiments of the present invention. In accordance with one or more embodiments, computing device 702 makes a user interface available to a user computing device 704 by communicating a definition of the user interface to the user computing device 704 via the network 706. The user interface definition can be specified using any of a number of languages, including without limitation a markup language such as Hypertext Markup Language, scripts, applets and the like. The user interface definition can be processed by an application executing on the user computing device 704, such as a browser application, to output the user interface on a display coupled, e.g., a display directly or indirectly connected, to the user computing device 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 7. Alternatively, embodiments of the present disclosure can be implemented other environments, e.g., a peer-to-peer environment as one non-limiting example.

Figure 8:
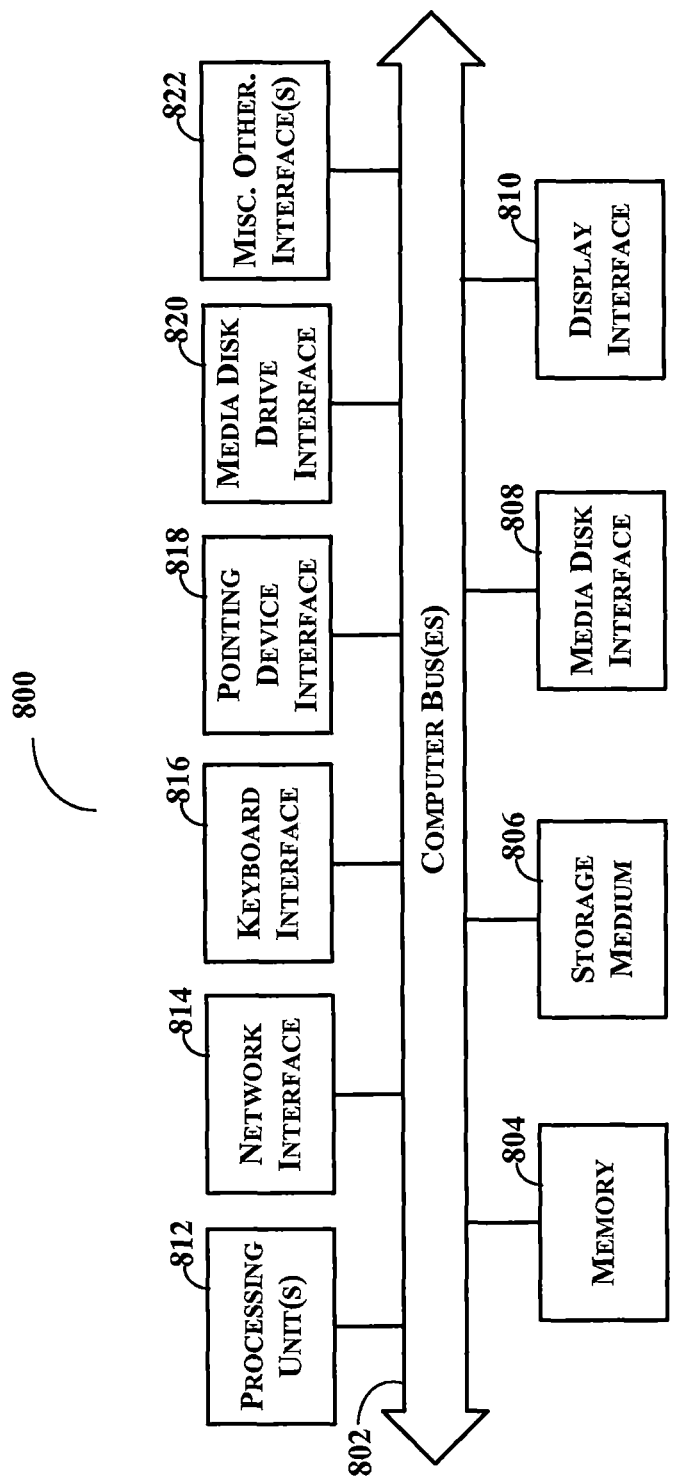
FIG. 8 is a detailed block diagram illustrating an internal architecture of a computing device in accordance with one or more embodiments of the present disclosure.

FIG. 8 is a detailed block diagram illustrating an internal architecture of a computing device, e.g., a computing device such as server 702 or user computing device 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 820 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:
1. A method comprising:
generating, by a social networking system server, a plurality of social-media message aggregates, each social-media message aggregate corresponding to a user of a plurality of users, the user's social-media message aggregate being generated from a plurality of the user's social-media messages and comprising a collection of words used in the user's social-media messages;

determining, by the social networking system server using a statistical model generator, a plurality of topics using the plurality of social-media message aggregates, each topic of the plurality identifying a set of words associated with the topic, each word in the set of words having an importance of the word to the topic, the importance of each word to the topic is determined using a determined number of occurrences, in the plurality of social-media message aggregates, of the word in association with the topic;

generating, by the social networking system server using the statistical model generator, a plurality of interest distributions, each interest distribution corresponds to one of the users of the plurality of users and is generated, by the statistical model generator, using the user's social-media message aggregate of the user's social-media messages, each user's interest distribution comprising the plurality of topics and, for each topic of the plurality of topics, information indicating the user's level of interest in the topic determined using the collection of words from the user's social-media message aggregate, the plurality of topics and the set of words associated with each topic of the plurality;

identifying, by the social networking system server, a topic of content of a current web page of a target user;

identifying, by the social networking system server using the interest distribution generated for each user, of the plurality of users, other than the target user, a number of users, other than the target user, having an interest in the topic of content of the current web page of the target user, each user of the number being identified as having a topical interest in the topic of content of the current web page of the target user, using the topic of content of the current web page and the interest distribution of the user indicating the user's level of interest in the topic of content of the current web page determined using the collection of words from the user's social-media message aggregate and the set of words associated with the topic of content of the current web rage;

causing, by the social networking system server, a recommendation to be transmitted to the target user at a client computing device, the recommendation recommending the number of users, to the target user, by identifying each user of the number of users having a topical interest in the topic of content of the current web page of the target user.

2. The method of claim 1, the number of users comprising at least one socially-related user of the plurality of users, the at least one socially-related user having a social relationship with the target user identified using a graph comprising a social network graph.

3. The method of claim 1, further comprising:
generating, by the social networking system server, a graph comprising a social network graph and a topical interest graph, the social network graph comprising nodes representing users and each edge connecting user nodes in the social network graph representing a social relationship, the topical interest graph comprising topic nodes representing the plurality of topics, each edge connecting a user node and a topic node in the topical interest graph representing a corresponding user's interest in the topic.

4. The method of claim 3, further comprising:
traversing, by the social networking system server, the graph to identify, for inclusion in the number of users, each user of the number of users having the topical interest in the topic of content of the current web page of the target user, each user of the number being identified as having a connection to the topic node of the topic of the current web page of the target user.

5. The method of claim 1, the number of users comprising at least one popular personality having a topical interest in the topic of content of the current web page of the target user.

6. The method of claim 1, the content of the current web page of the target user comprising a dialogue.

7. The method of claim 1, the content of the current web page of the target user comprising a number of topics, identification of the number of users of the plurality is performed for each topic of the number of topics to identify the number of user having a topical interest in the topic.

8. The method of claim 7, further comprising:
for a topic of the number of topics, ranking, by the social networking system server, the number of users based on their level of interest in the topic.

9. The method of claim 1, further comprising:
identifying, by the social networking system server, at least one other web page comprising content related to the topic of content of the current web page of the target user; and
causing, by the social networking system server, another recommendation to be transmitted to the target user, the other recommendation comprising information identifying the at least one other web page comprising content related to the topic of content of the current web page of the target user.

10. A non-transitory computer readable storage medium tangibly encoded with computer-executable instructions that when executed by a processor of a social networking system server perform a method comprising:

generating a plurality of social-media message aggregates, each social-media message aggregate corresponding to a user of a plurality of users, the user's social-media message aggregate being generated from a plurality of the user's social-media messages and comprising a collection of words used in the user's social-media messages;

determining, using a statistical model generator, a plurality of topics using the plurality of social-media message aggregates, each topic of the plurality identifying a set of words associated with the topic, each word in the set of words having an importance of the word to the topic, the importance of each word to the topic is determined using a determined number of occurrences, in the plurality of social-media message aggregates, of the word in association with the topic;

generating, using a statistical model generator, a plurality of interest distributions, each interest distribution corresponds to one of the users of the plurality of users and is generated, by the statistical model generator, using the user's social-media message aggregate of the user's social-media messages, each user's interest distribution comprising the plurality of topics and, for each topic of the plurality of topics, information indicating the user's level of interest in the topic determined using the collection of words from the user's social-media message aggregate, the plurality of topics and the set of words associated with each topic of the plurality;

identifying a topic of content of a current web page of a target user;

identifying, using the interest distribution generated for each user, of the plurality of users, other than the target user, a number of users, other than the target user, having an interest in the topic of content of the current web page of the target user, each user of the number being identified as having a topical interest in the topic of content of the current web page using the topic of content of the current web page and the interest distribution of the user indicating the user's level of interest in the topic of content of the current web page determined using the collection of words from the user's social-media message aggregate and the set of words associated with the topic of content of the current web page;

causing a recommendation to be transmitted to the target user at a client computing device, the recommendation recommending the number of users, to the target user, by identifying each user of the number of users having a topical interest in the topic of content of the current web page of the target user.

11. The non-transitory computer-readable storage medium of claim 10, the number of users comprising at least one socially-related user of the plurality of users, the at least one socially-related user having a social relationship with the target user identified using a graph comprising a social network graph.

12. The non-transitory computer-readable storage medium of claim 10, further comprising, generating a graph comprising a social network graph and a topical interest graph, the social network graph comprising nodes representing users and each edge connecting user nodes in the social network graph representing a social relationship, the topical interest graph comprising topic nodes representing the plurality of topics, each edge connecting a user node and a topic node in the topical interest graph representing a corresponding user's interest in the topic.

13. The non-transitory computer-readable storage medium of claim 12, further comprising:
traversing the graph to identify, for inclusion in the number of users, each user of the number of users having the topical interest in the topic of content of the current web page of the target user, each user of the number being identified as having a connection to the topic node of the topic of the current web page of the target user.

14. The non-transitory computer-readable storage medium of claim 10, the number of users comprising at least one popular personality having a topical interest in the topic of content of the current web page of the target user.

15. The non-transitory computer-readable storage medium of claim 10, the content of the current web page of the target user comprising a number of topics, identification of the number of users of the plurality is performed for each topic of the number of topics to identify the number of users having a topical interest in the topic.

16. The non-transitory computer-readable storage medium of claim 10, further comprising:
for a topic of the number of topics, ranking the number of users based on their level of interest in the topic.

17. The non-transitory computer-readable storage medium of claim 10, further comprising:
identifying at least one other web page comprising content related to the topic of content of the current web page of the target user; and
causing another recommendation to be transmitted to the target user, the other recommendation comprising information identifying the at least one other web page comprising content related to the topic of content of the current web page of the target user.

18. A social networking system server comprising:
a processor; and
a non-transitory storage medium for tangibly storing thereon program logic for execution by the processor, the program logic comprising:
generating logic executed by the processor for generating a plurality of social-media message aggregates, each social-media message aggregate corresponding to a user of a plurality of users, the user's social-media message aggregate being generated from a plurality of the user's social-media messages and comprising a collection of words used in the user's social-media messages;
determining logic executed by the processor for determining, using the statistical model generator, a plurality of topics using the plurality of social-media message aggregates, each topic of the plurality identifying a set of words associated with the topic, each word in the set of words having an importance of the word to the topic, the importance of each word to the topic is determined using a determined number of occurrences, in the plurality of social-media message aggregates, of the word in association with the topic;
generating logic executed by the processor for generating, using the statistical model generator, a plurality of interest distributions, each interest distribution corresponds to one of the users of the plurality of users and is generated, using the statistical model generator, using the user's social-media message aggregate of the user's social-media messages, each user's interest distribution comprising the plurality of topics and, for each topic of the plurality of topics, information indicating the user's level of interest in topic determined using the collection of words from the user's social-media message aggregate, the plurality of topics and the set of words associated with each topic of the plurality;
identifying logic executed by the processor for identifying a topic of content of a current web page of the target user;
identifying logic executed by the processor for identifying, using the plurality of interest distributions generated for each user, of the plurality of users, other than the target user, a number of users, other than the target user, having an interest in the topic of content of the current web page of the target user, each user of the number being identified as having a topical interest in the topic of content of the current web page of the target user using the topic of content of the current web page of the target user and the interest distribution of the user indicating the user's level of interest in the topic of content of the current web page determined using the collection of words from the user's social-media message aggregate and the set of words associated with the topic of content of the current web page;
causing logic executed by the processor for causing a recommendation to be transmitted to the target user at a client computing device, the recommendation recommending the number of users, to the target user, by identifying each user of the number of users having a topical interest in the topic of content of the current web page of the target user.

* * * * *